United States Patent [19]

Steinmetz et al.

[11] Patent Number: 4,587,472
[45] Date of Patent: May 6, 1986

[54] APPARATUS FOR CONTROLLING A MAGNET IN A MAGNETICALLY SUSPENDED VEHICLE HAVING A LINEAR STATOR

[75] Inventors: Günter Steinmetz, Train; Gerhard Bohn, Munich, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 715,495

[22] Filed: Mar. 25, 1985

[30] Foreign Application Priority Data

Mar. 27, 1984 [DE] Fed. Rep. of Germany ....... 3411190

[51] Int. Cl.⁴ ............................................. G05B 11/00
[52] U.S. Cl. ................................... 318/687; 318/135; 310/12; 104/290
[58] Field of Search ............................ 318/135, 687; 310/12-14; 104/290-294

[56] References Cited

U.S. PATENT DOCUMENTS 3,622,818 11/1971 Payen ................................ 318/135 X
3,679,958 7/1972 Peleno .................................. 318/135
4,368,413 1/1983 Tazaki ................................... 318/687
4,509,001 4/1985 Wakabayashi et al. ............. 318/687

Primary Examiner—B. Dobeck
Attorney, Agent, or Firm—W. G. Fasse; D. H. Kane, Jr.

[57] ABSTRACT

The levitating force of the levitation magnets of a magnetically levitated vehicle of the linear stator type is controlled for regulating the air gap width (S) between these levitation magnets (2) and a rail track having teeth of uniform, determined width in the travel direction. The control is responsive to the air gap width and, if desired, to the differentiation of the air gap width with respect to time. The control requirements are dependent on the vehicle speed, whereby in the low speed and stopping situations the primary task is a stabilizing one and in higher speed situations the primary task is a good following behavior. For this purpose a steering signal is derived from the output terminals of an induction conductor loop located in the surface of a pole piece of a levitation magnet facing the track teeth. The loop has a width corresponding to the tooth width. The frequency of the signal induced in the loop is directly proportional to the vehicle speed. The steering signal passes through an adapting circuit and is supplied to the magnet control circuit whereby the control parameters are adjusted according to the vehicle speed in order to fulfil the control requirements in the whole speed range.

9 Claims, 5 Drawing Figures

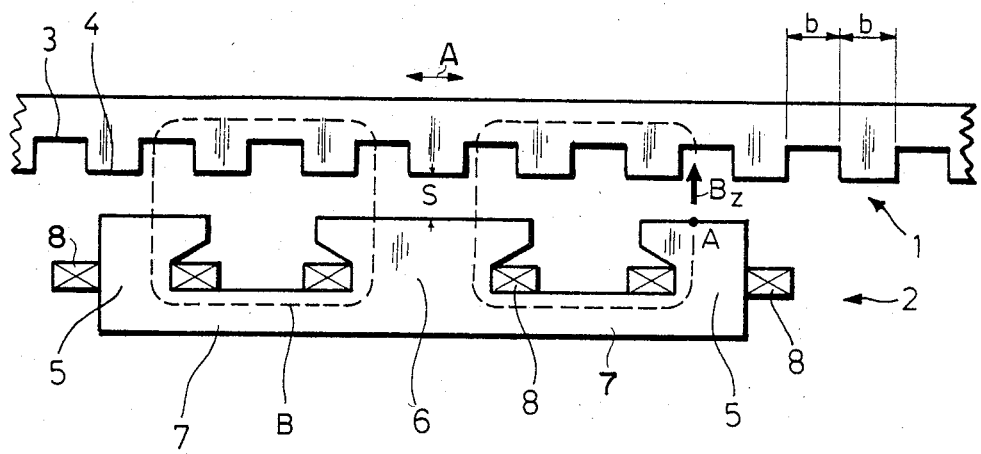
FIG. 2
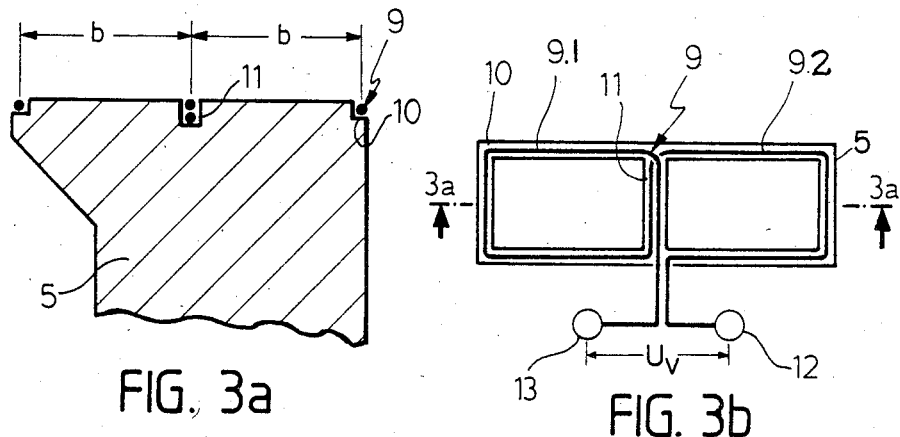
FIG. 3a
FIG. 3b
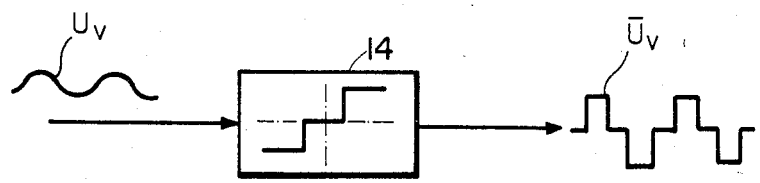
FIG. 4

APPARATUS FOR CONTROLLING A MAGNET IN A MAGNETICALLY SUSPENDED VEHICLE HAVING A LINEAR STATOR

FIELD OF THE INVENTION

The invention relates to a magnet controller for controlling an air gap between levitation magnets of a linear stator magnetically levitated vehicle and a regularly or uniformly toothed rail track. Such a magnet controller serves to modulate the magnetic force of the carrier magnets in response to the width S of the air gap and, if desired, in response to the differentiation of the air gap width S with respect to time.

In a linear stator magnetically levitated vehicle, such magnet controllers regulate the air gap width between the levitation magnets and their corresponding rails, which are toothed regularly for the levitation system. The levitation magnets may be referred to as the magnetic wheels, so to speak. Similar controllers also regulate or control the air gap width between the guidance magnets and the track. Such air gap control systems are realized for each magnetic wheel separately. The output of the individual controllers is proportional to the desired magnet voltage.

Magnet controllers for magnetically levitated vehicles, hereafter simply referred to as "vehicle", must satisfy two requirements, namely a stable control during standstill of the vehicle, and also a good rail following behaviour during high speed travel of the vehicle.

DESCRIPTION OF THE PRIOR ART

These two requirements could only be fulfilled by prior art magnet controls, if the rail track had a high stiffness and/or a high track mass, and simultaneously was laid with extreme accuracy. It is economically not feasable to build the track so that it satifies these high requirements because these requirements are reflected in the costs of the complete system.

For reasons of cost, these high requirements of the track are usually avoided, and a cheaper track of moderate mass and moderate accuracy is used. In order to maintain the air gap width which is on the order of one centimeter, relative to such a less expensive track structure, within allowable tolerances during the travel of the vehicle, a high control amplification is required for achieving the necessary good following behaviour. However, high control amplifications may induce oscillations of vibrations in the track during standstill of the vehicle. While the vehicle is in motion, the vibration problem does not arise, since the levitated vehicle floats, so to speak, only for a very short time over each single beam of the guideway. Efforts have been made to change the control parameters by a centrally determined velocity signal. This strategy, however, had to be abandoned for reasons of safety, since the centrally determined velocity signal should not be supplied to the otherwise fully autonomously operating suspension magnets corresponding to the magnetic wheels.

OBJECTS OF THE INVENTION

In view of the foregoing, it is the aim of the invention to achieve the following objects singly or in combination:

to develop a magnet control of the above described type in such a way that the vehicle and the guideway may be held in a stable state under all travelling and stationary operating conditions of the vehicle;

to provide such a magnet control whereby vibrations of the guideway are reliably prevented even in relatively light rail tracks with low stiffness laid with average accuracy; and to install or rather use a velocity dependent influence in the parameters of the control electronic circuits, in order to achieve an improved and safer magnet gap control.

SUMMARY OF THE INVENTION

The above objects have been achieved in a magnet control for magnetically levitated vehicles, according to the invention, by a conductor loop having a width corresponding to the width of a rail tooth, inserted in the surface of a pole of each levitation magnet. The connection terminals of the conductor loop are connected to an evaluating circuit for producing a steering signal G(f) having a d.c. level corresponding to the frequency of the output signal of the conductor loop. This steering signal may then be modulated onto or supplied to the magnet control for influencing the control parameters.

Accordingly, the travel velocity of a linear stator magnetically levitated vehicle is measured at each levitation magnet by measuring the frequency of the air gap induction waveform. That is, the velocity is determined locally and inductively with the aid of each respective conductor loop. The output signal of the conductor loop is evaluated according to its base frequency, and, after appropriate processing, it may then be supplied to the respective autonomous magnet control of the corresponding levitation magnet or "magnetic wheel". If this base frequency is zero or small corresponding to a standstill or slow velocity motion of the vehicle, then the control parameters, for instance the control amplification, are adjusted so that a stable standstill levitation is possible. Hereby, vibrations of the track may be reliably prevented, even of tracks having a relatively low mass and a low stiffness. The levitated vehicle is held stably in this case. If the above mentioned base frequency increases corresponding to a higher velocity of the levitated vehicle, the control parameters are changed, so that a good following behaviour of the magnets to their rail is achieved. In the alternative, when a certain frequency has been surpassed, the control parameter amplification may be switched in steps.

The magnet controller for a "magnetic wheel" comprises an observer for the guideway profile and the true controller that realizes the amplifications. According to the invention, it is essential that both these components are subject to a velocity influence. It is further contemplated, that a few parameters are not being increased in a steady or continuous manner in response to a rise in velocity. Rather, these parameters may have to have a minimum or threshold for a determined low speed.

The mentioned loop in the surface of a pole of each levitation magnet may be a single conductor loop having a width corresponding to the width of a rail tooth. As the vehicle travels along the track an alternating voltage is induced in this loop. The amplitude of this induced alternating voltage depends on the field amplitude and the waveform of the magnetic field between the magnet and the rail and on the speed of the vehicle. However, the frequency of this induced alternating voltage depends only on the speed of the vehicle. The magnetic field in the air gap between the levitation magnet and the rail track is also dependent on the switching strategy of the magnet current driver of the levitation magnets and on the output signal of the magnet controller. However, the influence of these disturbing effects on the magnetic field can be eliminated by using a double loop instead of the mentioned single loop or turn. The double loop has preferably a figure eight configuration of which each loop portion has the same size. Each loop portion again has a width corresponding to the width the rail tooth.

The double loop has the further advantage that it nearly prevents the direct coupling of the variable magnetic flux between the levitation magnet and the rail into the conductor loop. Rather, in this instance the variable magnetic flux merely modulates the amplitude of the output signal of the double loop.

It has been found that, for a stable control of the vehicle in low speed ranges, it is not necessary to measure the speed very accurately. The susceptibility of the system to interferences may be reduced substantially in a simple manner by a three state circuit arrangement or device which has three distinct states, for example on with full amplification, or with an intermediate amplification and off. The output signals of the conductor loop are supplied to the input of the three state circuit, whereby the alternating voltage induced in the conductor loop is converted in a simple manner into a stepped signal. The base frequency is then derived in a known manner from this stepped signal and the derived base frequency is proportional to the speed of the vehicle.

BRIEF DESCRIPTION OF THE DRAWINGS

In order that the invention may be clearly understood, it wil now be described in more detail with reference to the accompanying drawings, wherein:

FIG. 2 is a schematic view of a linear stator rail and a levitation magnet of a vehicle for explaining the function of a magnet control of the invention;

FIG. 3a is a sectional view along section line 3a—3a in FIG. 3b, on an enlarged scale relative to FIG. 2, through a portion of a pole piece of a levitation magnet of a magnetically suspended vehicle to show the location of the induction conductor loop for measuring the vehicle speed;

FIG. 3b shows in a simplified manner a top plan view of a levitation magnet pole piece for illustrating the configuration of the induction conductor loop; and FIG. 4 illustrates schematically the processing of the speed representing signal derived from the terminals of the induction conductor loop, to form a stepped waveform by means of a three state waveform shaping circuit.

Figure 1:
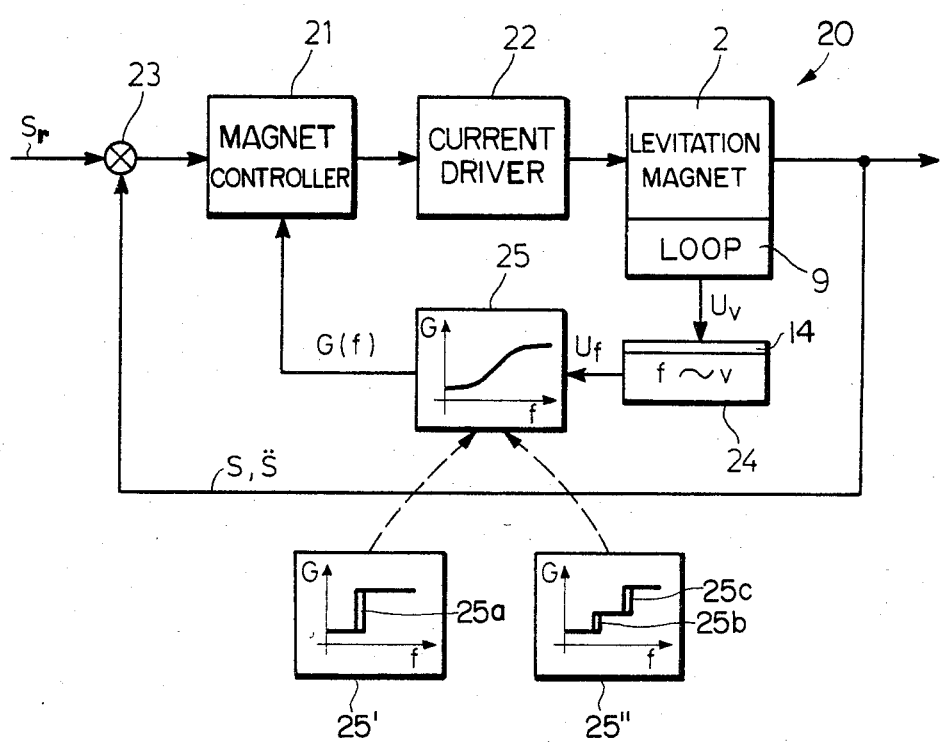
FIG. 1 is a block diagram of a magnet controller according to the invention for a linear stator magnetically levitated vehicle.

DETAILED DESCRIPTION OF PREFERRED EXAMPLE EMBODIMENTS AND OF THE BEST MODE OF THE INVENTION

Referring first to FIGS. 2, 3 and 4 the levitation rails 1 form a track on which a magnetically levitated vehicle travels in one or the other direction. Only one levitation magnet 2 is shown of the vehicle. The rails 1 form a linear stator which is provided with teeth 4 spaced by grooves 3. In the travel direction indicated by the double arrow A the grooves 3 and the teeth 4 have a uniform, regular, determined width b. These teeth 4 and grooves 3 face the levitation magnet 2.

The levitation magnet 2 comprises at each of its ends a pole piece 5, 5' having approximately an L-configuration. A further pole piece 6 having approximately a T-configuration is located intermediate the pole pieces 5, 5'. A magnetic yoke 7 interconnects the pole pieces 5, 5' and 6. Energizing magnetic coils 8 are wound around the pole pieces in a conventional manner. These coils produce a magnetic flux B as shown by dashed lines in FIG. 2 when an electric current flows through the coils 8. An air gap S is to be maintained between the teeth 4 and the surfaces of the pole pieces 5, 5' and 6.

If the levitation magnet 2 travels along the rail track 1, the field strength $B_z$ shown by a respective arrow in FIG. 2 will have a certain waveform depending on the fact whether the fixed point A on the pole piece 5 of the levitation magnet 2 is located opposite a groove 3 or opposite a tooth 4. The amplitude of the field strength waveform is larger when the pole piece faces a tooth than when it faces a groove.

The invention uses this waveform of the field strength $B_z$ for inducing in a conductor loop 9 an alternating voltage. The conductor loop 9 is shown in FIG. 3b and has, for example, two loop halves 9.1 and 9.2 forming together approximately a figure eight configuration. The ends of the loop 9 are connected to terminals 12 and 13 from which the alternating voltage signal may be picked up as will be described below. The loop 9 is inserted in grooves 10 and 11 as best seen in FIG. 3a. These grooves are located in the surface, for example of the pole piece 5. Each loop has again a width in the travel direction corresponding to the above mentioned groove and tooth width b, also as shown in FIG. 3a. It will be appreciated, that the voltage induced in the conductor loop 9 and available at the terminals 12, 13 depends on the magnitude of the field amplitude waveform and on the speed of the vehicle. However, the frequency of the induced voltage depends only on the speed of the vehicle.

By inserting the two loop halves in the grooves 10 and 11 and by shaping these loop halves 9.1, 9.2 in such a way, that they have the shown approximate figure eigth configuration it is possible to eliminate the waviness which is caused by the voltage impulses supplied by the final magnet control member 22 and by the magnetic dynamic of the system. The conductor of the double loop 9.1., 9.2 shown in FIG. 3b extends along the periphery of the pole piece 5 in the outer grooves 10, which are interconnected by the central groove 11. As a result the two loop halves 9.1 and 9.2 have two rectangular configurations each having the width b. The groove 11 is either deeper or wider to accommodate both loop legs.

FIG. 4 illustrates in its left hand part the voltage $U_v$ available at the terminals 12 and 13. The frequency f of the signal $U_v$ is directly proportional to the speed v of the vehicle, since the double loop 9 travels with the speed of the vehicle along the carrier rail 1. The terminals 12, 13 are connected to an input of a three state circuit member 14 having the characteristic illustrated in FIG. 4. This three state circuit 14 processes the signal $U_v$ to assume the waveform $\overline{U}_v$ as shown in FIG. 4. This step signal is then further processed in a circuit arrangement 24 evaluating the signal $\overline{U}_v$ in a conventional manner using digital or analog techniques, whereby evaluating circuit 24 provides at its output a signal $U_f$ which is directly proportional to the base frequency f of the signal $U_v$.

FIG. 1 illustrates a block diagram 20 of a circuit arrangement for energizing the coils 8 of the levitation magnets 2. The circuit arrangement comprises a summing circuit 23 which receives at its two inputs a rated air gap signal $S_r$ and at its other input a measured air gap signal which represents the air gap width S directly and the air gap acceleration $\bar{S}$ as a function of time. The output of the summing circuit 23 is connected to the magnet controller 21, which in turn is connected with its output to the final control member or actuator 22. The final control member 22 is connected with its output to the coils 8 of the respective levitation magnet 2. The above described loop 9 is connected with its terminals 12, 13 to the above mentioned three state circuit 14, which may be part of a signal evaluating circuit 24, the output of which supplies the output $U_f$ to a signal adapting circuit 25 for producing a steering signal G(f) as a function of the frequency of the magnetic field strength and thus a function of the vehicle speed as explained above. The steering signal G is supplied to a steering input of the magnet controller 21 which is a conventional control amplifier. The final control member 22 may, for example, be of the type as disclosed in FIG. 3 of German Patent Publication 3,143,512 (Steinmetz et al) published on May 11, 1983. In its simplest embodiment the three state circuit 14 may comprise diode circuits which switch when the amplitude of the signal $U_v$ exceeds or falls below defined positive and negative values so as to provide the three state or three stepped function illustrated in FIG. 4 and so that at the output of the circuit 14 the waveform $\bar{U}_v$ appears. Circuits for such wave shaping are well known in the art. The evaluating circuit 24 then processes the signal to provide the signal $U_f$ as a function of the frequency and thus of the vehicle speed to the input of the adapting circuit 25 which may either have the continuous characteristic as shown in FIG. 1, or which may have a two stepped characteristic as shown at 25' in FIG. 1, or which may have a three stepped characteristic as shown at 25" in FIG. 1. The circuits 25, 25' and 25" are well known in the art and as such are not part of the invention. The two step or two state circuit 25' may have a characteristic with a dead zone 25a also as shown in FIG. 1. Such dead zone provides a hysteresis type characteristic for switching slightly below and slightly above a reference point. Similarly, the three state circuit 25" of FIG. 1 may also have two dead zones 25b and 25c also providing a respective hysteresis type characteristic for the same purpose of switching slightly below and slightly above a reference point. The reference points are defined values of the frequency signal $U_f$. The switching levels may be "low" and "high" as shown at 25' in FIG. 1 or there may be three switching levels "low", "intermediate", and "high" as shown at 25" in FIG. 1.

The steering signal G(f) influences the magnetic controller 21 and thus modifies the amplification G provided for the energization of the coils of the magnet 2. When the frequency is low the amplification will be low. When the frequency is high at high speeds of the vehicle, the amplification will be high.

The adapting circuit 25 provides a continuous adaptation, so that at small frequencies corresponding to small vehicle speeds the amplification will be small with a steady rise in the amplification to a saturation level at higher frequencies corresponding to higher vehicle speeds. The saturation is reached, when the vehicle reaches its cruising speed. When the circuit 25' is used instead of the circuit 25, the amplification in the magnet controller 21 will remain constant up to a certain frequency or speed, whereupon the amplification jumps to the higher value or level, when the higher frequencies occur. The circuit 25" may be used instead of the circuit 25 or the circuit 25' and the amplification G is again increased in steps or levels, whereby the above mentioned dead zones stabilize the steering characteristic or steering response.

Although the invention has been described with reference to specific example embodiments, it will be appreciated, that it is intended to cover all modifications and equivalents within the scope of the appended claims.

What we claim is:

1. An apparatus for controlling the force of a levitation magnet in a magnetically levitated vehicle having a linear stator, comprising a uniformly toothed rail track with teeth each having a determined width in the travel direction, levitation magnets having pole pieces with surfaces facing said rail track teeth, a groove in said pole piece surface, an induction conductor loop in said groove, said induction conductor loop including output terminals, said conductor loop having a loop width in the travel direction corresponding to said determined width of said track teeth for inducing in said conductor loop an alternating signal having a frequency proportional to the vehicle speed on said track, levitation magnet control circuit means operatively connected to said levitation magnets for energizing said carrier magnets, signal processing circuit means operatively connected to said output terminals of said conductor loop for receiving said alternating signal to produce a control signal representing the vehicle speed, and feed back means connecting an output of said signal processing circuit means to said magnet control circuit means for controlling the magnet force in response to said control signal.

2. The apparatus of claim 1, wherein said induction conductor loop comprises a double loop having approximately a figure eight configuration with two equal loop halves, each loop half having a width corresponding to said determined width of said track teeth.

3. The apparatus of claim 1, wherein said signal processing circuit means comprise a three state circuit connected with its input terminals to said output terminals of said conductor loop for providing a three level control signal.

4. The apparatus of claim 3, wherein said signal processing circuit means further comprise a signal adapting circuit connected between an output of said three state circuit and said magnet control circuit means for producing said control signal so that said control signal is directly proportional to said frequency of said alternating signal and thus to the vehicle speed.

5. The apparatus of claim 4, wherein said signal adapting circuit has a characteristic curve which is continuous between a low signal value and a high signal value.

6. The apparatus of claim 4, wherein said signal adapting circuit has a characteristic curve with steps therein.

7. The apparatus of claim 6, wherein said characteristic curve has two steps and a dead zone for causing a hysteresis type effect.

8. The apparatus of claim 6, wherein said characteristic curve has three steps therein.

9. The apparatus of claim 8, wherein said characteristic curve with three steps has two dead zones for causing hysteresis type effects.

* * * * *